Patented Feb. 5, 1946

2,394,268

UNITED STATES PATENT OFFICE 2,394,268

BROMINATION OF AROMATIC ACIDS

Cecil Arthur Spencer, Plainfield, N. J., assignor to American Cyanamid Company, New York, N. Y., a corporation of Maine No Drawing. Application July 11, 1944, Serial No. 544,465

14 Claims. (Cl. 260—515)

This invention relates to an improved process for bominating acids particularly of the benzene and naphthalene series.

Bromination of aromatic acids presents a number of difficulties. In many cases the reaction is slow and requires very active catalysts and precise operating conditions and frequently side reactions take place or the starting material is destroyed which adversely affects the yield to the point where the procedure becomes economically impractical.

It has been proposed to brominate organic acids by acidifying a mixture of alkali metal bromide and an oxidizing agent such as hypochlorite, which is capable of oxidizing the hydrobromic acid to hypobromous acid. This process operates in aqueous medium but results in chlorination as well as bromination producing a mixture from which the separation of the chlorinated from the brominated acids is almost impossible.

The difficulties resulting from the use of an oxidizing agent such as hypochlorite are not encountered in a process which has been proposed specifically for the bromination of phthalic acid in which one mol of sodium phthalate was reacted with one to one and one-half mols of bromine in the presence of 1½ mols of sodium hypobromite. This process is capable of producing a reasonably pure bromophthalic acid but it requires three mols of bromine and more than five mols of sodium hydroxide and the cost is therefore excessive. It was thought that the hypobromite was necessary and that no useful bromination of sodium phthalate resulted with bromine alone.

According to the present invention I have found that no oxidizing agent or hypobromite is necessary and that aromatic acid, such as phthalic acid, can be brominated directly in water solution with bromine provided they are made water soluble by transformation into their alkali metal salts. It is only necessary to add the bromine continuously or in portions with an amount of alkali which is not materially greater than that required to react with the hydrobromic acid set free by the reaction. It is, however, important that there is sufficient alkali present at the start of the reaction so that the organic acid is transformed into a water-soluble neutral salt. In the case of a dibasic acid such as phthalic acid, it is necessary to be sure that the neutral disodium phthalate is produced at the start of the bromination.

The present process operates without a large excess of bromine; normally a slight excess up to about 10% is sufficient. The amount of alkali required is also greatly reduced, being only sufficient to form the neutral alkali metal salt and to react with the hydrobromic acid produced in the reaction. No material excess of alkali is neded. In fact, any large excess has a deleterious effect because it reacts with the bromine to form bromides and hypobromites and bromates, none of which compounds are capable of brominating the acid. Material excess of alkali above the requirement set out above also results in the production of additional amounts of salts with the excess bromine, and have a salting out effect in the case of acids such as phthalic acid which does not produce extremely soluble salts. The reaction of the present invention depends on maintaining all of the acid in solution in the form of its neutral salt at the start of the reaction. The salting out effect is particularly serious when it is desired to produce the higher brominated compounds as precipitation of incompletely brominated products or the occlusion of unbrominated or partially brominated material results. It is therefore an important feature of the present invention that the alkali be not materially in excess of that necessary to produce the neutral salt of the acid at the start of the bromination, and to react with the hydrobromic acid set free as the reaction proceeds. For this reason it is desirable that the alkali be added either continuously or in portions as the bromine is added.

Except in the beginning, where sufficient alkali is added to produce a soluble neutral salt, the alkali is added after each addition of bromine. The course of the reaction will set free hydrobromic acid in the case of a monobasic acid. With dibasic acids such as phthalic acid, the acid salt is normally set free and this is transformed into the neutral salt by the added alkali. In every case, therefore, the result of the reaction is to increase the acidity either by forming hydrobromic acid or by forming acid salts and the effect of the additional alkali is to neutralize the acidity thus produced.

The present invention is particularly important in the production of brominated phthalic acid which is an industrial chemical of considerable value. However, the invention is in no sense limited to the bromination of phthalic acid and it includes generally the bromination of various organic acids of the benzene and naphthalene series such as benzoic, phthalic, isophthalic, terephthalic, trimesic, trimellitic, hemimellitic and naphthalic acids.

The alkali to be used may be any of the ordinary strong alkalies. I find that sodium hydroxide gives excellent results and is in many ways the preferred alkali. However, the process may be carried out with other common alkalies such as potassium hydroxide, sodium carbonate, potassium carbonate and the like. Naturally no alkali should be used which forms water insoluble salts with the acid to be brominated. This excludes the use of alkaline earth metal hydroxides with many organic acids as the salts are too insoluble to permit practical operation.

It is an advantage of the present invention that the temperature at which the reaction takes place is not critical. Appreciable bromination takes place at temperatures below 30° C. However, the reaction is so slow that it is preferable to brominate at moderately elevated temperatures above 30° C. Excellent results are obtained at temperatures of about 90° to 100° C. and temperatures in this approximate range are preferred. The rate of bromination also varies with the amount of bromine which has been introduced; for example, in the case of brominated phthalic acid, it is feasible to operate with an initial temperature of about 30° C., but the last part of the reaction would proceed slowly and it is advantageous to raise the temperature. The fact that temperatures are not at all critical makes the process of the present invention easy to operate on a large scale as it does not require critical control and hence permits operation with a minimum of skilled supervision.

The amount of water in the reaction mixture is also not critical. It is important that sufficient water be present so that the unreacted salts of the acid remain in solution and in the case of the production of polybrominated products that the products of lower stages of bromination are also maintained in the dissolved form. The amount of water required will of course vary with the acid to be brominated and with the number of bromine atoms which are to be introduced in each molecule. In general, reliability of operation and convenience dictates the use of a small excess of water so that there is no danger of undesired precipitation during the reaction. Larger amounts of water do not have any serious adverse effects but very large excesses are undesirable as they dilute the reaction mixture and make the recovery of the final brominated product more expensive. It is, therefore, preferred to operate with an amount of water not greatly in excess of that necessary to maintain unreacted material in solution.

The brominated products are preferably recovered from the reaction mixture by acidification. Such brominated acids or acid salts are, in general, much less soluble than their alkali metal salts. The acid to be used in the precipitation step is not critical and, in general, any acid may be used which precipitates the free brominated acid or an acid salt.

Sulfuric acid being cheap, and as effective as any, is normally to be preferred for economic reasons. In the case of a dibasic acid, such as phthalic acid, it is often desirable to add acid until a relatively insoluble acid salt is produced rather than to add sufficient acid to set free the phthalic acid itself. In general, however, it is undesirable to use a large excess of acid over that necessary to effect the precipitation.

After the precipitation of the brominated acids or acid salts, they are preferably recovered by filtration, and losses in this step are of course kept to a minimum when no large excess of water is used in the reaction mixture. This is an additional reason for the preferred procedure of avoiding a large excess of water. In general, it is necessary to wash the precipitate obtained because it is normally contaminated with some soluble salts such as the alkali metal bromides. The washing step should, therefore, be carried out with considerable care using as little water and as low temperatures as possible to avoid losses of the brominated acid. Optimum amounts and temperature of wash water should therefore be chosen for each particular acid and, while not extremely critical, care should be taken to keep losses in this step to a minimum.

The washed product will normally be dried and in this step care should be taken to effect the drying at temperatures which will not result in material losses by sublimation where the brominated acid has any considerable vapor pressure.

The invention will be described in greater detail in conjunction with the following specific examples which illustrate bromination in a series of steps; the same results are obtainable by continuous bromination. Parts are by weight.

*Example 1*

326 parts of phthalic anhydride were added to 665 parts of water and the temperature raised to 50° C. About 176 parts of caustic soda as a 50% water solution were then slowly added until all the anhydride was dissolved and a very faint color change was produced on brilliant yellow paper. The charge was then cooled to 30° C. Bromination was effected in 3 steps. In the first step, 176 parts of bromine were added to the charge uniformly during 1 hour, maintaining the temperature at 30° C. The temperature was then gradually raised to 95° and maintained at that temperature for an additional hour or so until a test on starch iodide paper showed no unreacted bromine. Some precipitation took place during this period. The charge was then cooled to 80° C. and about 45–50 parts of caustic soda as a 50% water solution were slowly added to the faintest color change on brilliant yellow paper, and all precipitated product had re-dissolved. The charge was again cooled to 30° C. The second step was carried out in the same manner as the first, but using 117 parts of bromine and 25–30 parts of caustic soda. In the last step, 88 parts of bromine were added during 30 minutes, keeping the temperature at 30° C. The temperature was raised to 95° C. during the course of an hour and held at that temperature for 30 minutes after there was no longer a positive test on starch iodide paper. About 120 parts of 50% sulfuric acid were then slowly added to a moderately strong test on Congo paper and the charge was cooled to 25° C. and stirred for 1 hour longer. The charge was filtered by suction and the filter cake washed with 845 parts of ice water added as 6½ separate portions. The filter cake was dried at 85° C. and run through a micro mill. The resulting product is the monobromophthalate.

*Example 2*

Benzoic acid was brominated to the monobromo derivative, following approximately the same detailed procedure indicated in Example 1 and starting with 114 parts of benzoic acid and 37.5 parts of sodium hydroxide in 200 parts of water. Bromination took place in three steps using 74.8, 37.4 and 44.8 parts of bromine respectively, with the intermediate addition of 18.8 parts of sodium hydroxide between the first and second bromination steps and 9.4 parts of sodium hydroxide between the second and third bromination steps. Bromination proceeded more slowly than with the phthalic acid and required a four-hour heating period at the last step to complete the bromination.

*Example 3*

Monobromonaphthalic acid was obtained following approximately the same procedure given in detail in Example 1 and starting with 50.6 parts of naphthalic acid and 18.8 parts of sodium hydroxide in 400 parts of water. Bromination was carried out in 3 steps using 18.8, 9.4 and 11.2 parts of bromine respectively, with the intermediate addition of 4.7 parts of sodium hydroxide between the first and second bromination steps and 2.8 parts of sodium hydroxide between the second and third bromination steps. Bromination took place more rapidly at the lower temperatures than in the case of benzoic acid.

The number of steps used for the alternate additions of first bromine and then alkali, and the fractions of the theoretical quantities of bromine and of alkali to be used for each addition may be adjusted to meet individual working requirements, or a continuous process for providing substantially equivalent conditions may be employed. In general, the number of alternate additions of bromine and then alkali is preferably not reduced below three, and an even greater number is desirable, since the bromination proceeds more smoothly and causes less mechanical difficulty immediately following the neutralization by alkali when there is complete solution than at a later time when some precipitation has occurred.

The amount of bromine to be added in slight excess of the theoretical is determined largely by the particular equipment used in carrying out the process. Whenever bromine is added at a rate greater than the absorption rate under the particular operating conditions employed, or whenever the temperature is raised too rapidly after the bromine is added, gaseous bromine may be evolved and lost to the atmosphere unless adequate means for preventing such losses are provided.

I claim:

1. A process for brominating an organic acid of the benzene and naphthalene series with bromine in aqueous medium which comprises adding sufficient alkali at the start of the reaction to transform the organic acid into a water soluble neutral salt, the amount of water present being sufficient to maintain the salt in solution, adding a portion of bromine and permitting it to react until substantially no free bromine exists, thereafter adding an amount of alkali not substantially in excess of that required to neutralize the acids produced in the bromination step, and continuing the alternate additions of portions of bromine and alkali in said manner until said bromination is complete.

2. A process for brominating an organic acid of the benzene and naphthalene series with bromine in aqueous medium which comprises adding sufficient alkali at the start of the reaction to transform the organic acid into a water soluble neutral salt, the amount of water present being sufficient to maintain the salt in solution, adding a portion of bromine and permitting it to react until substantially no free bromine exists, thereafter adding an amount of alkali not substantially in excess of that required to neutralize the acids produced in the bromination step, and continuing the alternate additions of portions of bromine and alkali in said manner until said bromination is complete, and reacting the brominated salt after completion of bromination with an acid sufficiently strong to effect precipitation.

3. A process for brominating phthalic acid with bromine in aqueous medium which comprises adding sufficient alkali at the start of the reaction to transform the phthalic acid into a water soluble neutral salt, the amount of water present being sufficient to maintain the salt in solution, adding a portion of bromine and permitting it to react until substantially no free bromine exists, thereafter adding an amount of alkali not substantially in excess of that required to neutralize the acids produced in the bromination step, and continuing the alternate additions of portions of bromine and alkali in said manner until said bromination is complete.

4. A process for brominating phthalic acid with bromine in aqueous medium which comprises adding sufficient alkali at the start of the reaction to transform the phthalic acid into a water soluble neutral salt, the amount of water present being sufficient to maintain the salt in solution, adding a portion of bromine and permitting it to react until substantially no free bromine exists, thereafter adding an amount of alkali not substantially in excess of that required to neutralize the acids produced in the bromination step, and continuing the alternate additions of portions of bromine and alkali in said manner until said bromination is complete, and reacting the brominated salt after completion of bromination with an acid sufficiently strong to effect precipitation, the amount of acid being not greater in excess of that theoretically required to effect precipitation.

5. A method according to claim 1 in which the bromination reaction is completed at a temperature of about 90° to 100° C.

6. A method according to claim 3, in which the bromination reaction is completed at a temperature of about 90° to 100° C.

7. A method according to claim 1 in which the amount of bromine is not in excess of 10% over the theoretical.

8. A method according to claim 3 in which the amount of bromine is not in excess of 10% over the theoretical.

9. A method according to claim 1 in which the alkali is sodium hydroxide.

10. A method according to claim 3 in which the alkali is sodium hydroxide.

11. A method according to claim 1 in which the acid is benzoic acid.

12. A method according to claim 2 in which the acid is benzoic acid.

13. A method according to claim 1 in which the acid is naphthalic acid.

14. A method according to claim 2 in which the acid is naphthalic acid.

CECIL ARTHUR SPENCER.